United States Patent
Yang et al.

(10) Patent No.: US 12,284,123 B2
(45) Date of Patent: Apr. 22, 2025

(54) METHOD FOR INDICATING ANTENNA PANEL INFORMATION OF TERMINAL, NETWORK SIDE DEVICE, AND TERMINAL

(71) Applicant: VIVO MOBILE COMMUNICATION CO., LTD., Guangdong (CN)

(72) Inventors: Yu Yang, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 400 days.

(21) Appl. No.: 17/509,276

(22) Filed: Oct. 25, 2021

(65) Prior Publication Data
US 2022/0045810 A1    Feb. 10, 2022

Related U.S. Application Data

(63) Continuation of application No. PCT/CN2020/086109, filed on Apr. 22, 2020.

(30) Foreign Application Priority Data

Apr. 26, 2019 (CN) .......................... 201910345787.8

(51) Int. Cl.
*H04L 5/00* (2006.01)

(52) U.S. Cl.
CPC ............ *H04L 5/001* (2013.01); *H04L 5/0048* (2013.01); *H04L 5/0098* (2013.01)

(58) Field of Classification Search
CPC ..... H04L 5/001; H04L 5/0048; H04L 5/0098; H04L 5/0007; H04L 5/0092; H04L 5/0051; H04L 5/0023; H04W 24/02; H04W 72/046; H04W 72/23; H04W 72/231; H04W 72/232
See application file for complete search history.

(56) References Cited

U.S. PATENT DOCUMENTS

| 2014/0016576 A1 | 1/2014 | Noh |
| 2014/0098780 A1* | 4/2014 | Kim ................. H04W 72/0446 370/329 |
| 2019/0068263 A1* | 2/2019 | Yu .......................... H04B 7/088 |
| 2020/0052853 A1* | 2/2020 | Qin ...................... H04B 7/0691 |
| 2020/0244334 A1 | 7/2020 | Huang et al. |

(Continued)

FOREIGN PATENT DOCUMENTS

| CN | 109417717 A | 3/2019 |
| KR | 101938346 B1 | 1/2019 |
| WO | 2018228119 A1 | 12/2018 |

OTHER PUBLICATIONS

U.S. Appl. No. 62/805,543, filed Feb. 14, 2019 (Year: 2019).*

(Continued)

*Primary Examiner* — Sun Jong Kim
(74) *Attorney, Agent, or Firm* — Price Heneveld LLP (57) ABSTRACT

A method for indicating antenna panel information of a terminal, a network side device, and a terminal are provided. The indication method applied to a network side device includes: sending configuration information of a first SRS resource set to a terminal, where the configuration information includes an identifier of the first SRS resource set, and the identifier of the first SRS resource set is used to indicate an identifier of an antenna panel of the terminal.

12 Claims, 4 Drawing Sheets

(56) References Cited

U.S. PATENT DOCUMENTS

| | | | |
|---|---|---|---|
| 2020/0267536 A1* | 8/2020 | Zhou | H04B 7/0404 |
| 2021/0119678 A1* | 4/2021 | Zhu | H04W 24/10 |
| 2021/0288711 A1* | 9/2021 | Cao | H04W 72/046 |
| 2021/0336737 A1 | 10/2021 | Li | |
| 2022/0029696 A1* | 1/2022 | Chaves | H04B 7/18504 |
| 2022/0104031 A1* | 3/2022 | Matsumura | H04W 72/23 |
| 2022/0217654 A1* | 7/2022 | Kang | H04W 52/14 |
| 2023/0309080 A1* | 9/2023 | Cirik | H04L 5/0023 |

OTHER PUBLICATIONS

CMCC, "Enhancements on multi-beam operation", 3GPP TSG RAN WG1 #96bis, R1-1904736, Xi'an, China, Apr. 8-12, 2019.
Fraunhofer, "Enhancements on UE multi-beam operation", 3GPP TSG RAN WG1 Meeting #96-Bis, R1-1904217, Ki'an, China Apr. 8-12, 2019.
Huawei, "Panel-based UL beam selection", 3GPP TSG RAN WG1 Meeting #96bis, R1-1903975, Xi'an, China, Apr. 8-12, 2019.
Sony, "Enhancements on multi-beam operation", 3GPP TSG RAN WG1 #96bis, R1-1904241, Xi'an, China, Apr. 8-12, 2019.
Fraunhofer Iis, Fraunhofer Hhi, "UE panel-specific UL transmission," 3GPP TSG RAN WG1 Meeting AH-1901 R1-1900359, Taipei, Taiwan Jan. 21-25, 2019 (5 pages).
Vivo, "Further discussion on Multi-Beam Operation," 3GPP TSG RAN WG1 Meeting #96 R1-1901703, Athens, Greece, Feb. 25-Mar. 1, 2019 (7 pages).
Xiaomi, "Enhancements on beam management," 3GPP TSG RAN WG1 #96bis R1-1905075, Xi'an, China, Apr. 8-12, 2019 (4 pages).
"3rd Generation Partnership Project; Technical Specification Group Radio Access Network; NR; Radio Resource Control (RRC) protocol specification (Release 15)", 3GPP TS 38.331 V15.54.0 (Mar. 2019), Valbonne, France.

* cited by examiner

FIG. 1

Send configuration information of a first SRS resource set to a terminal, where the configuration information includes an identifier of the first SRS resource set, and the identifier of the first SRS resource set is used to indicate an identifier of an antenna panel of the terminal — 21

FIG. 2

Receive configuration information of a first SRS resource set sent by a network side device, where the configuration information includes an identifier of the first SRS resource set, and the identifier of the first SRS resource set is used to indicate an identifier of an antenna panel of the terminal — 31

METHOD FOR INDICATING ANTENNA PANEL INFORMATION OF TERMINAL, NETWORK SIDE DEVICE, AND TERMINAL

CROSS-REFERENCE OF RELATED APPLICATION

This application is a continuation application of International Application No. PCT/CN2020/086109 filed on Apr. 22, 2020, which claims priority to Chinese Patent Application No. 201910345787.8 filed in China on Apr. 26, 2019, which are incorporated herein by reference in their entireties.

TECHNICAL FIELD

Embodiments of the present disclosure relate to the field of wireless communications technologies, and in particular, to a method for indicating antenna panel information of a terminal, a network side device, and a terminal.

BACKGROUND

Radio access technology standards such as Long Term Evolution (LTE)/LTE-Advanced (LTE-A) are all constructed based on multiple-input multiple-output (MIMO)+ orthogonal frequency division multiplexing (OFDM) technologies. The MIMO technology improves a peak rate and system spectrum utilization by using a spatial degree of freedom available in a multiple-antenna system.

In a standardization development process, dimensions of the MIMO technology are constantly expanded. In LTE Rel-8, a maximum of 4 layers of MIMO transmission can be supported. In Rel-9, in an enhanced multi-user MIMO (MU-MIMO) technology, a maximum of 4 downlink data layers can be supported in MU-MIMO transmission of a transmission mode (TM)-8. In Rel-10, a transmission capability of single-user MIMO (SU-MIMO) is expanded to a maximum of 8 data layers.

The industry is further pushing the MIMO technology towards a three-dimensional and large-scale direction. At present, 3GPP is carrying out research and standardization of NR MIMO. It may be predicted that a MIMO technology with a larger scale and more antenna ports will be introduced in a future 5G mobile communications system.

When a user terminal (UE) has multiple antenna panels, to reduce power consumption and avoid excessive radiation of a human body from signals emitted by the terminal, switches and switching of the antenna panels may need to be controlled. This requires introduction of an antenna panel identifier (panel ID), so that information of an antenna panel can be exchanged between a network side and the terminal, to indicate a switch, downlink reception, and uplink transmission of the antenna panel.

Therefore, how to use information to indicate the identifier of the antenna panel of the terminal, so that information of the antenna panel can be exchanged between the network side and the terminal is a technical problem to be solved urgently.

SUMMARY

The embodiments of the present disclosure provide a method for indicating antenna panel information of a terminal, a network side device, and a terminal According to a first aspect, an embodiment of the present disclosure provides a method for indicating antenna panel information of a terminal, applied to a network side device, including:
sending configuration information of a first SRS resource set to a terminal, where the configuration information includes an identifier of the first SRS resource set, and the identifier of the first SRS resource set is used to indicate an identifier of an antenna panel of the terminal.

According to a second aspect, an embodiment of the present disclosure provides a method for indicating antenna panel information of a terminal, applied to a terminal, including:
receiving configuration information of a first SRS resource set sent by a network side device, where the configuration information includes an identifier of the first SRS resource set, and the identifier of the first SRS resource set is used to indicate an identifier of an antenna panel of the terminal.

According to a third aspect, an embodiment of the present disclosure provides a network side device, including:
a first sending module, configured to send configuration information of a first SRS resource set to a terminal, where the configuration information includes an identifier of the first SRS resource set, and the identifier of the first SRS resource set is used to indicate an identifier of an antenna panel of the terminal.

According to a fourth aspect, an embodiment of the present disclosure provides a terminal, including:
a first receiving module, configured to receive configuration information of a first SRS resource set sent by a network side device, where the configuration information includes an identifier of the first SRS resource set, and the identifier of the first SRS resource set is used to indicate an identifier of an antenna panel of the terminal.

According to a fifth aspect, an embodiment of the present disclosure provides a network side device, including a processor, a memory, and a computer program stored in the memory and executable on the processor, where the computer program, when executed by the processor, performs the steps of the method for indicating antenna panel information of a terminal that is applied to the network side device.

According to a sixth aspect, an embodiment of the present disclosure provides a terminal, including a processor, a memory, and a computer program stored in the memory and executable on the processor, where the computer program, when executed by the processor, performs the steps of the method for indicating antenna panel information of a terminal that is applied to the terminal.

According to a seventh aspect, an embodiment of the present disclosure provides a computer readable storage medium. The computer readable storage medium stores a computer program, and the computer program, when executed by a processor, performs the steps of the method for indicating antenna panel information of a terminal.

BRIEF DESCRIPTION OF DRAWINGS

It becomes clear for a person of ordinary skill in the art to learn various other advantages and benefits by reading detailed description of the following optional implementation manners. Accompanying drawings are merely used for showing the optional implementations, and are not considered as a limitation on the present disclosure. In all accompanying drawings, a same reference symbol is used to indicate a same part. In the accompanying drawings.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of the present disclosure shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those clearly listed steps or units, but may include other steps or units not clearly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design scheme described as an "exemplary" or "example" in the embodiments of the present disclosure should not be explained as being more preferred or having more advantages than another embodiment or design scheme. To be precise, the use of the term such as "exemplary" or "for example" is intended to present a related concept in a specific manner.

The embodiments of the present disclosure are described below with reference to the accompanying drawings. The method for indicating antenna panel information of a terminal, the network side device, and the terminal provided in the embodiments of the present disclosure may be applied to a wireless communications system. The wireless communications system may be a 5G system, an evolved long term evolution (eLTE) system, or a subsequent evolved communications system.

Figure 1:
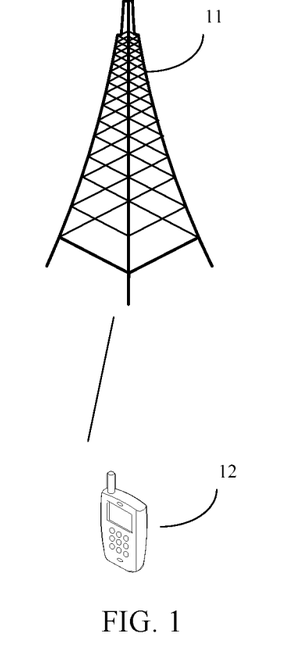
FIG. 1 is a schematic architectural diagram of a wireless communications system according to an embodiment of the present disclosure.

FIG. 1 is a schematic architectural diagram of a wireless communications system according to an embodiment of the present disclosure. As shown in FIG. 1, the wireless communications system may include: a network side device 11 and a terminal 12. For example, the terminal 12 may be connected to the network side device 11. In actual application, a connection between the devices may be a wireless connection. For ease of visually indicating a connection relationship between the devices, a solid line is used for illustration in FIG. 1.

It should be noted that the communications system may include a plurality of terminals 12, and the network side device 11 may communicate (transmit signaling or data) with the plurality of terminals 12.

The network side device 11 provided in this embodiment of the present disclosure may be a base station. The base station may be a commonly used base station, or may be an evolved nodeB (eNB), or may be a device such as a network side device (for example, a next generation nodeB (gNB) or a transmission and reception point (TRP)) in a 5G system, or a cell, or may be a network side device in a subsequent evolved communications system. The terms used constitute no limitation.

The terminal 12 provided in this embodiment of the present disclosure may be a mobile phone, a tablet computer, a notebook computer, an ultra-mobile personal computer (UMPC), a netbook, a personal digital assistant (PDA), or the like. A person skilled in the art may understand that the terms used constitute no limitation.

Figure 2:
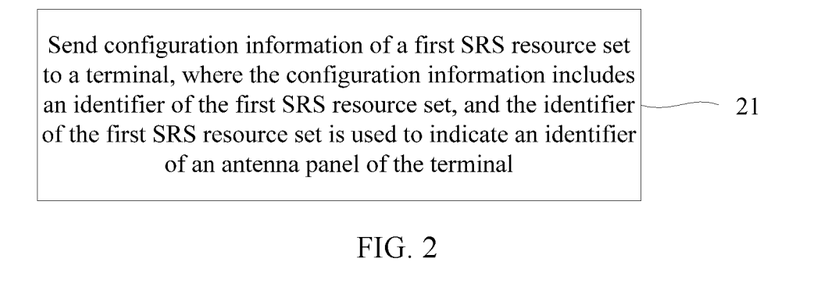
FIG. 2 is a schematic flowchart of a method for indicating antenna panel information of a terminal according to an embodiment of the present disclosure.

FIG. 2 is a schematic flowchart of a method for indicating antenna panel information of a terminal according to an embodiment of the present disclosure. The indication method is applied to a network side device and includes:

Step 21: Send configuration information of a first sounding reference signal (SRS) resource set to a terminal, where the configuration information includes an identifier (ID) of the first SRS resource set, and the identifier of the first SRS resource set is used to indicate an identifier (ID) of an antenna panel of the terminal.

In the embodiments of the present disclosure, the identifier of the first SRS resource set is used to indicate the identifier of the antenna panel of the terminal, so that the information of the antenna panel can be exchanged between the network side and the terminal. In addition, the first SRS resource set does not need to be actually sent. Therefore, this does not occupy excessive resources to reduce impact on the protocol.

The first SRS resource set in the embodiments of the present disclosure is a dummy SRS resource set, and is different from an SRS resource set in the related technology. After the SRS resource set in the related technology is configured, the SRS resource set needs to be actually sent by a terminal, to perform beam measurement and other purposes. However, the first SRS resource set in the embodiments of the present disclosure is used to indicate the identifier of the antenna panel of the terminal, and does not need to be actually sent by a terminal.

The following briefly describes configuration information of the SRS resource set in the related technology.

The network side uses RRC signaling (parameter is SRS-ResourceSet) to configure one or more SRS resource sets for the terminal. For each SRS resource set, the network side uses RRC signaling (parameter is SRS-Resource) to configure at least one SRS resource, and the maximum number of SRS resources is determined by a capability of the terminal.

The usage of the SRS resource set is determined based on radio resource control (RRC) signaling (a parameter of usage in SRS-ResourceSet). When the network configures usage as beam management (BeamManagement), for each SRS resource set, only one SRS resource can be sent at an uplink transmission moment. SRS resources in different SRS resource sets with the same time domain behavior (periodic, semi-persistent, or aperiodic) in the same BWP (bandwidth part) can be simultaneously transmitted by the terminal.

The network side implements beam indication of an SRS by configuring a spatial relation between a reference RS and a target SRS. An RRC parameter used is SpatialRelation-Info, which includes a reference RS ID. The reference RS can be an SS/PBCH block (or referred to as an SSB), a CSI-RS (a CSI reference signal), or an SRS.

Specifically, when an SRS type is a periodic SRS, the network side configures a spatial relation for an SRS resource through RRC signaling. When the SRS type is a semi-persistent SRS, the network side activates, through a MAC CE command, one of a group of spatial relations configured through RRC signaling. When the SRS type is an aperiodic SRS, the network side configures a spatial relation for an SRS resource through RRC signaling. For an aperiodic SRS, the terminal receives downlink control information (DCI) sent by the network side, and the network side uses at least one state in a DCI field to trigger at least one of configured SRS resource sets.

In the above description, a beam can also be referred to as a spatial filter, a spatial domain transmission filter, or the like. Beam information can also be referred to as transmission configuration indication state (TCI state) information, quasi co-location (QCL) information, spatial relation information, or the like.

The configuration information of the first SRS resource set in the embodiments of the present disclosure is different from configuration information of an SRS resource set in the related technology. The following examples are used for description.

In some embodiments of the present disclosure, optionally, the configuration information further includes: other configuration parameters of the SRS resource set other than the identifier of the first SRS resource set, where at least one of the other configuration parameters is not configured with a parameter value.

Assuming that the SRS resource set in the related technology has a total of 5 configuration parameters (an identifier of the SRS resource set is a configuration parameter), the first SRS resource set in the embodiments of the present disclosure can also have 5 configuration parameters. Different from the SRS resource set in the related technology, at least one of configuration parameters of the first SRS resource set is not configured with a parameter value.

In some embodiments of the present disclosure, optionally, that at least one of the other configuration parameters is not configured with a parameter value includes: a specified configuration parameter of the other configuration parameters is not configured with a parameter value. For example, the specified configuration parameter can be information of an SRS resource, such as an identifier (ID) of the SRS resource. It is understandable that in the SRS resource set in the related technology, the information of the SRS resource must be configured. However, the information of the SRS resource is not configured in the configuration parameter of the first SRS resource set. Therefore, it can be determined that the SRS resource set is a dummy SRS resource set.

In some embodiments of the present disclosure, optionally, that at least one of the other configuration parameters is not configured with a parameter value includes: all of the other configuration parameters are not configured with parameter values.

In some embodiments of the present disclosure, optionally, the configuration information further includes: a resource type of the first SRS resource set, and the resource type is configured to be aperiodic or semi-persistent. If the resource type of the first SRS resource set is configured to be aperiodic or semi-persistent, the network side device does not send trigger signaling or an activation command of the first SRS resource set to the terminal. If the terminal does not receive the trigger signaling or the activation command, the terminal considers that the first SRS resource set is a dummy SRS resource set, and does not send the first SRS resource set to the network side device. If the resource type of the first SRS resource set is configured to be aperiodic or semi-persistent, all configuration parameters in the configuration information of the first SRS resource set can be configured with parameter values, or as mentioned above, at least one of the other configuration parameters other than the identifier of the first SRS resource set may not be configured with a parameter value. In addition, the configuration information may not include usage indication information (does not include a usage indication information field, or includes a usage indication information field but does not configure a parameter value), or include usage indication information.

In some embodiments of the present disclosure, optionally, the configuration information further includes: a resource type of the first SRS resource set, where the resource type is configured to be periodic; and usage indication information, where the usage indication information is used to indicate that the identifier of the first SRS resource set is used to indicate the identifier of the antenna panel of the terminal. When the terminal receives the configuration information of the first SRS resource set whose resource type is periodic, if the configuration information further includes the usage indication information, the terminal can determine that the configuration information is configuration information of a dummy SRS resource set according to the usage indication information, and does not send the first SRS resource set.

In some embodiments of the present disclosure, optionally, the configuration information further includes: usage indication information, where the usage indication information is used to indicate that the identifier of the first SRS resource set is used to indicate the identifier of the antenna panel of the terminal.

In some embodiments of the present disclosure, optionally, the usage indication information is indicated explicitly.

In some embodiments of the present disclosure, optionally, the usage indication information is indicated implicitly.

In some embodiments of the present disclosure, optionally, the usage indication information is indicated explicitly, the usage indication information is a newly added configuration parameter in the configuration information. For example, 1 bit is newly added, to configure the usage indication information.

In some embodiments of the present disclosure, optionally, the usage indication information is in usage information in the configuration information. That is, the usage indication information is configured in usage information in the related technology, and no new parameter needs to be added to the configuration information of the SRS resource set. The usage information is used to indicate usage of the SRS resource set, and the usage information may further include at least one of the following: beam management, codebook, non-codebook, antenna switching, and the like. Certainly, the usage information may include only the usage indication information.

In some embodiments of the present disclosure, optionally, when the usage indication information is indicated implicitly, at least one specified configuration parameter in the configuration information is not configured with a parameter value or configured as a specified value. For example, the specified configuration parameter is information of an SRS resource. In the configuration information of the first SRS resource set, the information of the SRS resource is not configured with a parameter value, or is configured as a special specified value, so that the terminal may determine the usage of the first SRS resource set based on the specified configuration parameter.

In some embodiments of the present disclosure, optionally, the number of first SRS resource sets is equal to the number of antenna panels of the terminal. The identifier of the first SRS resource set and the identifier of the antenna panel are in a one-to-one correspondence. It is assumed that a first SRS resource set, that is, set 1 corresponds to antenna panel 1, and a first SRS resource set, that is, set 2 corresponds to antenna panel 2. Therefore, identifiers of first SRS resource sets may be used to indicate identifiers of all antenna panels of the terminal.

In some embodiments of the present disclosure, optionally, the indication method further includes:

sending configuration information of a second SRS resource set to the terminal, where the second SRS resource set is used for beam management; where A sum of the number of first SRS resource sets and the number of second SRS resource sets is equal to the number of antenna panels of the terminal. Therefore, identifiers of first SRS resource sets and identifiers of second SRS resource sets may be used to indicate identifiers of all antenna panels of the terminal.

Certainly, in some embodiments of the present disclosure, if the number of configured second SRS resource sets is equal to the number of antenna panels of the terminal, the configuration information of the first SRS resource set may not be configured.

In some embodiments of the present disclosure, optionally, the sending configuration information of a first SRS resource set to a terminal includes:

if the terminal is a terminal with multiple antenna panels, sending the configuration information of the first SRS resource set to the terminal; or if the terminal supports configuration of the second SRS resource set and the configurable number of second SRS resource sets supported is greater than 1, determining that the terminal is a terminal with multiple antenna panels, and sending the configuration information of the first SRS resource set to the terminal; or if the terminal supports configuration of the second SRS resource set and the configurable number of SRS resource sets supported is greater than 1, determining that the terminal is a terminal with multiple antenna panels, and sending the configuration information of the first SRS resource set to the terminal; or if the terminal supports configuration of the second SRS resource set, the configurable number of second SRS resource sets supported is 1, and the terminal is a terminal with multiple antenna panels, sending the configuration information of the first SRS resource set to the terminal; or if the terminal supports configuration of the second SRS resource set, the configurable number of SRS resource sets supported is 1, and the terminal is a terminal with multiple antenna panels, sending the configuration information of the first SRS resource set to the terminal;

where the second SRS resource set is used for beam management.

That is, when the terminal is a terminal with multiple antenna panels, the configuration information of the first SRS resource set is sent to the terminal, to distinguish multiple antenna panels of the terminal.

The terminal that supports configuration of the second SRS resource set is a terminal that supports uplink beam management.

Optionally, when only one antenna panel of the terminal can send uplink information at the same time, for example, the configurable number of SRS resource sets supported by the terminal is greater than 1 and multiple antenna panels cannot send information at the same time, or the configurable number of SRS resource sets supported by the terminal is 1, the network side device can send the configuration information of the first SRS resource set and the configuration information of one second SRS resource set to the terminal, or send the configuration information of the first SRS resource set to the terminal, to indicate the identifier of the antenna panel of the terminal.

Optionally, when multiple antenna panels of the terminal can send uplink information at the same time, for example, the configurable number of SRS resource sets supported by the terminal is greater than 1 and multiple antenna panels can send information at the same time, or the configurable number of SRS resource sets supported by the terminal is greater than 1 and SRS resources in multiple SRS resource sets can be sent at the same time, the network side device can send the configuration information of the first SRS resource set and/or send the configuration information of the second SRS resource set to the terminal, to indicate the identifier of the antenna panel of the terminal.

The terminal in the embodiments of the present disclosure may be a terminal that supports beam correspondence or a terminal that does not support beam correspondence. Supporting beam correspondence means that an uplink beam can be determined according to a downlink beam training result.

The following is a brief introduction of downlink beam training in beam management.

In current academia and industry, a polling method is usually used to train analog beamforming vectors. To be specific, array elements of each antenna panel in each polarization direction sequentially send a training signal (that is, a candidate beamforming vector) at an appointed time in a time division multiplexing mode, and a terminal feeds back a beam report after measurement, so that a network side can use the training signal to implement simulated beam transmission during a next service transmission. Content of a beam report usually includes identifiers of several optimal transmit beams and measured receive power of each transmit beam.

In some embodiments of the present disclosure, optionally, the method further includes:

if the terminal does not support configuration of the second SRS resource set, determining that the terminal is a terminal with a single antenna panel, and skipping sending the configuration information of the first SRS resource set to the terminal; or if the terminal is a terminal with a single antenna panel, skipping sending the configuration information of the first SRS resource set to the terminal; or if the terminal supports configuration of the second SRS resource set and the configurable number of second SRS resource sets supported is 1, determining that the terminal is a terminal with a single antenna panel, and skipping sending the configuration information of the first SRS resource set to the terminal; or if the terminal supports configuration of the second SRS resource set and the configurable number of SRS resource sets supported is 1, determining that the terminal is a terminal with a single antenna panel, and skipping sending the configuration information of the first SRS resource set to the terminal;

where the second SRS resource set is used for beam management.

In other words, when the terminal is a terminal with a single antenna panel, there is no need to distinguish antenna panels. Therefore, the configuration information of the first SRS resource set may not be sent to the terminal.

In some embodiments of the present disclosure, optionally, the method further includes: receiving terminal capability information reported by the terminal, where the terminal capability information includes at least one of the following:

whether the terminal supports configuration of the second SRS resource set;

the configurable number of second SRS resource sets supported by the terminal;

the configurable number of SRS resource sets supported by the terminal; and the number of antenna panels of the terminal.

In some embodiments of the present disclosure, optionally, the sending configuration information of a first SRS resource set to a terminal includes: sending the configuration information of the first SRS resource sets belonging to different component carriers or different BWPs to the terminal.

In some embodiments of the present disclosure, optionally, in the configuration information of the first SRS resource sets belonging to different component carriers or different BWPs, an identifier of the same antenna panel of the terminal is indicated by using the same identifier of the first SRS resource set, to avoid confusion of the terminal. For example, the network is configured with two first SRS resource sets belonging to BWP1 and two first SRS resource sets belonging to BWP2. Identifiers of the first SRS resource sets in BWP1 are set1 and set2, and identifiers of the first SRS resource sets in BWP2 are also set1 and set2, to indicate identifiers of the two antenna panels of the terminal.

Figure 3:
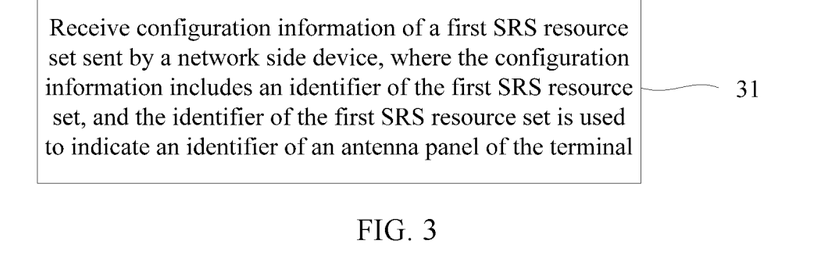
FIG. 3 is a schematic flowchart of a method for indicating antenna panel information of a terminal according to another embodiment of the present disclosure.

Referring to FIG. 3, the embodiments of the present disclosure further provide a method for indicating antenna panel information of a terminal, applied to a terminal, including:

Step 31: Receive configuration information of a first SRS resource set sent by a network side device, where the configuration information includes an identifier of the first SRS resource set, and the identifier of the first SRS resource set is used to indicate an identifier of an antenna panel of the terminal.

In the embodiments of the present disclosure, the identifier of the first SRS resource set is used to indicate the identifier of the antenna panel of the terminal, so that the information of the antenna panel can be exchanged between the network side and the terminal. In addition, the first SRS resource set does not need to be actually sent. Therefore, this does not occupy excessive resources to reduce impact on the protocol.

The first SRS resource set in the embodiments of the present disclosure is a dummy SRS resource set, and is different from an SRS resource set in the related technology. After the SRS resource set in the related technology is configured, the SRS resource set needs to be actually sent by a terminal, to perform beam measurement and other purposes. However, the first SRS resource set in the embodiments of the present disclosure is used to indicate the identifier of the antenna panel of the terminal, and does not need to be actually sent by a terminal.

The configuration information of the first SRS resource set in the embodiments of the present disclosure is different from configuration information of an SRS resource set in the related technology. The following examples are used for description.

In some embodiments of the present disclosure, optionally, the configuration information further includes:

other configuration parameters of the SRS resource set other than the identifier of the first SRS resource set, where at least one of the other configuration parameters is not configured with a parameter value.

In some embodiments of the present disclosure, optionally, that at least one of the other configuration parameters is not configured with a parameter value includes: a specified configuration parameter of the other configuration parameters is not configured with a parameter value; or all of the other configuration parameters are not configured with parameter values.

In some embodiments of the present disclosure, optionally, the configuration information further includes: a resource type of the first SRS resource set, and the resource type is configured to be aperiodic or semi-persistent. If the configuration information of the first SRS resource set received by the terminal includes a resource type configured to be aperiodic or semi-persistent, and the terminal does not receive trigger signaling or an activation command that is used to trigger or activate the first SRS resource set and that is sent by the network side, the terminal considers that the first SRS resource set is a dummy SRS resource set, and does not send the first SRS resource set.

In some embodiments of the present disclosure, optionally, the configuration information further includes:

a resource type of the first SRS resource set, where the resource type is configured to be periodic; and usage indication information, where the usage indication information is used to indicate that the identifier of the first SRS resource set is used to indicate the identifier of the antenna panel of the terminal.

If the configuration information of the first SRS resource set received by the terminal includes the resource type configured to be periodic, and the configuration information includes the usage indication information, the terminal considers that the first SRS resource set is a dummy SRS resource set, and does not send the first SRS resource set.

In some embodiments of the present disclosure, optionally, the configuration information further includes:

usage indication information, where the usage indication information is used to indicate that the identifier of the first SRS resource set is used to indicate the identifier of the antenna panel of the terminal.

In some embodiments of the present disclosure, optionally, the usage indication information is indicated explicitly or implicitly.

In some embodiments of the present disclosure, optionally, when the usage indication information is indicated explicitly, the usage indication information is a newly added configuration parameter in the configuration information, for example, 1 bit is newly added, to configure the usage indication information; or the usage indication information is in usage information in the configuration information. That is, the usage indication information is configured in usage information in the related technology, and no new parameter needs to be added to the configuration information of the SRS resource set. The usage information is used to indicate usage of the SRS resource set, and the usage information may further include at least one of the following: beam management, codebook, non-codebook, antenna switching, and the like. Certainly, the usage information may include only the usage indication information.

In some embodiments of the present disclosure, optionally, when the usage indication information is indicated implicitly, at least one specified configuration parameter in the configuration information is not configured with a parameter value or configured as a specified value.

In some embodiments of the present disclosure, optionally, the number of first SRS resource sets is equal to the number of antenna panels of the terminal.

In some embodiments of the present disclosure, optionally, the method further includes:
receiving configuration information of a second SRS resource set sent by the network side device, where the second SRS resource set is used for beam management; and
a sum of the number of first SRS resource sets and the number of second SRS resource sets is equal to the number of antenna panels of the terminal.

In some embodiments of the present disclosure, optionally, the method further includes:
reporting terminal capability information to the network side device, where the terminal capability information includes at least one of the following:
whether the terminal supports configuration of the second SRS resource set;
the configurable number of second SRS resource sets supported by the terminal;
the configurable number of SRS resource sets supported by the terminal; and
the number of antenna panels of the terminal.

In some embodiments of the present disclosure, optionally, the receiving configuration information of a first SRS resource set sent by a network side device includes:
receiving the configuration information that is of the first SRS resource sets belonging to different component carriers or different BWPs and that is sent by the network side device.

In some embodiments of the present disclosure, optionally, in the configuration information of the first SRS resource sets belonging to different component carriers or different BWPs, an identifier of the same antenna panel of the terminal is indicated by using the same identifier of the first SRS resource set, to avoid confusion of the terminal.

For example, the network is configured with two first SRS resource sets belonging to BWP1 and two first SRS resource sets belonging to BWP2. Identifiers of the first SRS resource sets in BWP1 are set1 and set2, and identifiers of the first SRS resource sets in BWP2 are also set1 and set2, to indicate identifiers of the two antenna panels of the terminal.

In some embodiments of the present disclosure, optionally, after the receiving configuration information of a first SRS resource set sent by a network side device, the method further includes:
if different identifiers of the first SRS resource set are used to indicate an identifier of a first antenna panel of the terminal in the configuration information of the first SRS resource sets belonging to different component carriers or different BWPs, the identifier of the first antenna panel is indicated by using an identifier of the first SRS resource set of a specified component carrier or a specified BWP. The specified component carrier or the specified BWP may be a component carrier or a BWP with a particular characteristic, for example, a component carrier with the smallest index or a BWP with the smallest ID.

For example, the network is configured with two first SRS resource sets belonging to BWP1 and two first SRS resource sets belonging to BWP2. Identifiers of the first SRS resource sets in BWP1 are set1 and set2, and identifiers of the first SRS resource sets in BWP2 are set3 and set4. To uniquely indicate the identifiers of the two antenna panels of the terminal, identifiers of the first SRS resource sets on a BWP with the smallest BWP ID, namely, set1 and set2, can be used to indicate the identifiers of the two antenna panels of the terminal. Based on the same invention idea, referring to FIG. 4, the present disclosure further provides a network side device 40, including:
a first sending module 41, configured to send configuration information of a first SRS resource set to a terminal, where the configuration information includes an identifier of the first SRS resource set, and the identifier of the first SRS resource set is used to indicate an identifier of an antenna panel of the terminal.

Figure 4:
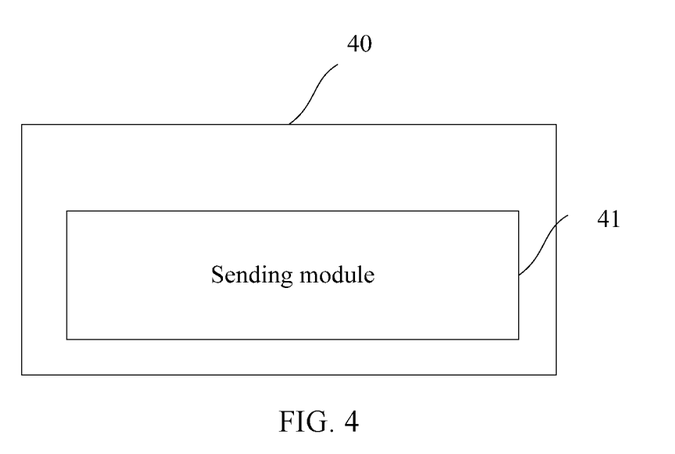
FIG. 4 is a schematic structural diagram of a network side device according to an embodiment of the present disclosure.

In the embodiments of the present disclosure, the identifier of the first SRS resource set is used to indicate the identifier of the antenna panel of the terminal, so that the information of the antenna panel can be exchanged between the network side and the terminal. In addition, the first SRS resource set does not need to be actually sent. Therefore, this does not occupy excessive resources to reduce impact on the protocol.

In some embodiments of the present disclosure, optionally, the configuration information further includes:
other configuration parameters of the SRS resource set other than the identifier of the first SRS resource set, where at least one of the other configuration parameters is not configured with a parameter value.

In some embodiments of the present disclosure, optionally, that at least one of the other configuration parameters is not configured with a parameter value includes: a specified configuration parameter of the other configuration parameters is not configured with a parameter value; or all of the other configuration parameters are not configured with parameter values.

In some embodiments of the present disclosure, optionally, the configuration information further includes: a resource type of the first SRS resource set, and the resource type is configured to be aperiodic or semi-persistent.

In some embodiments of the present disclosure, optionally, the configuration information further includes:
a resource type of the first SRS resource set, where the resource type is configured to be periodic; and
usage indication information, where the usage indication information is used to indicate that the identifier of the first SRS resource set is used to indicate the identifier of the antenna panel of the terminal.

In some embodiments of the present disclosure, optionally, the configuration information further includes:
usage indication information, where the usage indication information is used to indicate that the identifier of the first SRS resource set is used to indicate the identifier of the antenna panel of the terminal.

In some embodiments of the present disclosure, optionally, the usage indication information is indicated explicitly or implicitly.

In some embodiments of the present disclosure, optionally, when the usage indication information is indicated explicitly,
the usage indication information is a newly added configuration parameter in the configuration information; or
the usage indication information is in usage information in the configuration information.

In some embodiments of the present disclosure, optionally, when the usage indication information is indicated implicitly, at least one specified configuration parameter in the configuration information is not configured with a parameter value or configured as a specified value.

In some embodiments of the present disclosure, optionally, the number of first SRS resource sets is equal to the number of antenna panels of the terminal.

In some embodiments of the present disclosure, optionally, the network side device further includes:
a second sending module, configured to send configuration information of a second SRS resource set to the terminal, where the second SRS resource set is used for beam management; where
a sum of the number of first SRS resource sets and the number of second SRS resource sets is equal to the number of antenna panels of the terminal.

In some embodiments of the present disclosure, optionally, the first sending module is configured to: if the terminal is a terminal with multiple antenna panels, send the configuration information of the first SRS resource set to the terminal.

In some embodiments of the present disclosure, optionally, the first sending module is configured to: if the terminal supports configuration of the second SRS resource set and the configurable number of second SRS resource sets supported is greater than 1, determine that the terminal is a terminal with multiple antenna panels, and send the configuration information of the first SRS resource set to the terminal.

In some embodiments of the present disclosure, optionally, the first sending module is configured to: if the terminal supports configuration of the second SRS resource set and the configurable number of SRS resource sets supported is greater than 1, determine that the terminal is a terminal with multiple antenna panels, and send the configuration information of the first SRS resource set to the terminal.

In some embodiments of the present disclosure, optionally, the first sending module is configured to: if the terminal supports configuration of the second SRS resource set, the configurable number of second SRS resource sets supported is 1, and the terminal is a terminal with multiple antenna panels, send the configuration information of the first SRS resource set to the terminal; or if the terminal supports configuration of the second SRS resource set, the configurable number of SRS resource sets supported is 1, and the terminal is a terminal with multiple antenna panels, sending the configuration information of the first SRS resource set to the terminal;
where the second SRS resource set is used for beam management.

Optionally, when only one antenna panel of the terminal can send uplink information at the same time, for example, the configurable number of SRS resource sets supported by the terminal is greater than 1 and multiple antenna panels cannot send information at the same time, or the configurable number of SRS resource sets supported by the terminal is 1, the first sending module can send the configuration information of the first SRS resource set and the configuration information of one second SRS resource set to the terminal, or send the configuration information of the first SRS resource set to the terminal, to indicate the identifier of the antenna panel of the terminal.

Optionally, when multiple antenna panels of the terminal can send uplink information at the same time, for example, the configurable number of SRS resource sets supported by the terminal is greater than 1 and multiple antenna panels can send information at the same time, or the configurable number of SRS resource sets supported by the terminal is greater than 1 and SRS resources in multiple SRS resource sets can be sent at the same time, the first sending module can send the configuration information of the first SRS resource set and/or send the configuration information of the second SRS resource set to the terminal, to indicate the identifier of the antenna panel of the terminal.

In some embodiments of the present disclosure, optionally, the network side device further includes:
a first execution module, configured to: if the terminal does not support configuration of the second SRS resource set, determine that the terminal is a terminal with a single antenna panel, and skip sending the configuration information of the first SRS resource set to the terminal; or
a second execution module, configured to: if the terminal is a terminal with a single antenna panel, skip sending the configuration information of the first SRS resource set to the terminal; or if the terminal supports configuration of the second SRS resource set and the configurable number of second SRS resource sets supported is 1, determine that the terminal is a terminal with a single antenna panel, and skip sending the configuration information of the first SRS resource set to the terminal; or
a third execution module, configured to: if the terminal supports configuration of the second SRS resource set and the configurable number of SRS resource sets supported is 1, determine that the terminal is a terminal with a single antenna panel, and skip sending the configuration information of the first SRS resource set to the terminal;
where the second SRS resource set is used for beam management.

In some embodiments of the present disclosure, optionally, the network side device further includes:
a receiving module, configured to receive terminal capability information reported by the terminal, where the terminal capability information includes at least one of the following:
the configurable number of second SRS resource sets supported by the terminal;
the configurable number of SRS resource sets supported by the terminal;
whether the terminal supports configuration of the second SRS resource set; and
the number of antenna panels of the terminal.

In some embodiments of the present disclosure, optionally, the first sending module is configured to send the configuration information of the first SRS resource sets belonging to different component carriers or different BWPs to the terminal.

In some embodiments of the present disclosure, optionally, in the configuration information of the first SRS resource sets belonging to different component carriers or different BWPs, an identifier of the same antenna panel of the terminal is indicated by using the same identifier of the first SRS resource set.

For example, the network is configured with two first SRS resource sets belonging to BWP1 and two first SRS resource sets belonging to BWP2. Identifiers of the first SRS resource sets in BWP1 are set1 and set2, and identifiers of the first SRS resource sets in BWP2 are also set1 and set2, to indicate identifiers of the two antenna panels of the terminal.

Figure 5:
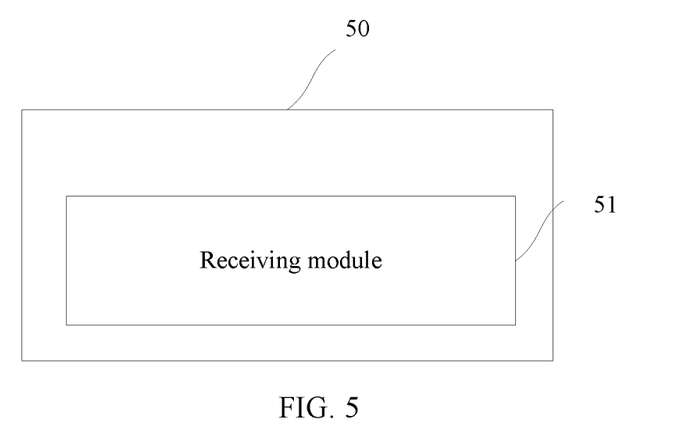
FIG. 5 is a schematic structural diagram of a terminal according to an embodiment of this disclosure.

Based on the same invention idea, referring to FIG. 5, the present disclosure further provides a terminal 50, including:
  a first receiving module, configured to receive configuration information of a first SRS resource set sent by a network side device, where the configuration information includes an identifier of the first SRS resource set, and the identifier of the first SRS resource set is used to indicate an identifier of an antenna panel of the terminal.

In the embodiments of the present disclosure, the identifier of the first SRS resource set is used to indicate the identifier of the antenna panel of the terminal, so that the information of the antenna panel can be exchanged between the network side and the terminal. In addition, the first SRS resource set does not need to be actually sent. Therefore, this does not occupy excessive resources to reduce impact on the protocol.

In some embodiments of the present disclosure, optionally, the configuration information further includes:
  other configuration parameters of the SRS resource set other than the identifier of the first SRS resource set, where at least one of the other configuration parameters is not configured with a parameter value.

In some embodiments of the present disclosure, optionally, that at least one of the other configuration parameters is not configured with a parameter value includes: a specified configuration parameter of the other configuration parameters is not configured with a parameter value; or
  all of the other configuration parameters are not configured with parameter values.

In some embodiments of the present disclosure, optionally, the configuration information further includes: a resource type of the first SRS resource set, and the resource type is configured to be aperiodic or semi-persistent.

In some embodiments of the present disclosure, optionally, the configuration information further includes:
  a resource type of the first SRS resource set, where the resource type is configured to be periodic; and
  usage indication information, where the usage indication information is used to indicate that the identifier of the first SRS resource set is used to indicate the identifier of the antenna panel of the terminal.

In some embodiments of the present disclosure, optionally, the configuration information further includes:
  usage indication information, where the usage indication information is used to indicate that the identifier of the first SRS resource set is used to indicate the identifier of the antenna panel of the terminal.

In some embodiments of the present disclosure, optionally, the usage indication information is indicated explicitly or implicitly.

In some embodiments of the present disclosure, optionally, when the usage indication information is indicated explicitly,
  the usage indication information is a newly added configuration parameter in the configuration information; or
  the usage indication information is in usage information in the configuration information.

In some embodiments of the present disclosure, optionally, when the usage indication information is indicated implicitly, at least one specified configuration parameter in the configuration information is not configured with a parameter value or configured as a specified value.

In some embodiments of the present disclosure, optionally, the number of first SRS resource sets is equal to the number of antenna panels of the terminal.

In some embodiments of the present disclosure, optionally, the terminal further includes:
  a second receiving module, configured to receive configuration information of a second SRS resource set sent by the network side device, where the second SRS resource set is used for beam management; where
  a sum of the number of first SRS resource sets and the number of second SRS resource sets is equal to the number of antenna panels of the terminal.

In some embodiments of the present disclosure, optionally, the terminal further includes:
  a reporting module, configured to report terminal capability information to the network side device, where the terminal capability information includes at least one of the following:
  whether the terminal supports configuration of the second SRS resource set;
  the number of antenna panels of the terminal;
  the configurable number of second SRS resource sets supported by the terminal; and
  the configurable number of SRS resource sets supported by the terminal.

In some embodiments of the present disclosure, optionally, the first receiving module is configured to receive the configuration information that is of the first SRS resource sets belonging to different component carriers or different BWPs and that is sent by the network side device.

In some embodiments of the present disclosure, optionally, in the configuration information of the first SRS resource sets belonging to different component carriers or different BWPs, an identifier of the same antenna panel of the terminal is indicated by using the same identifier of the first SRS resource set.

For example, the network is configured with two first SRS resource sets belonging to BWP1 and two first SRS resource sets belonging to BWP2. Identifiers of the first SRS resource sets in BWP1 are set1 and set2, and identifiers of the first SRS resource sets in BWP2 are also set1 and set2, to indicate identifiers of the two antenna panels of the terminal.

In some embodiments of the present disclosure, optionally, if different identifiers of the first SRS resource set are used to indicate an identifier of a first antenna panel of the terminal in the configuration information of the first SRS resource sets belonging to different component carriers or different BWPs, the identifier of the first antenna panel is indicated by using an identifier of the first SRS resource set of a specified component carrier or a specified BWP.

For example, the network is configured with two first SRS resource sets belonging to BWP1 and two first SRS resource sets belonging to BWP2. Identifiers of the first SRS resource sets in BWP1 are set1 and set2, and identifiers of the first SRS resource sets in BWP2 are set3 and set4. To uniquely indicate the identifiers of the two antenna panels of the terminal, identifiers of the first SRS resource sets on a BWP with the smallest BWP ID, namely, set1 and set2, can be used to indicate the identifiers of the two antenna panels of the terminal.

Figure 6:
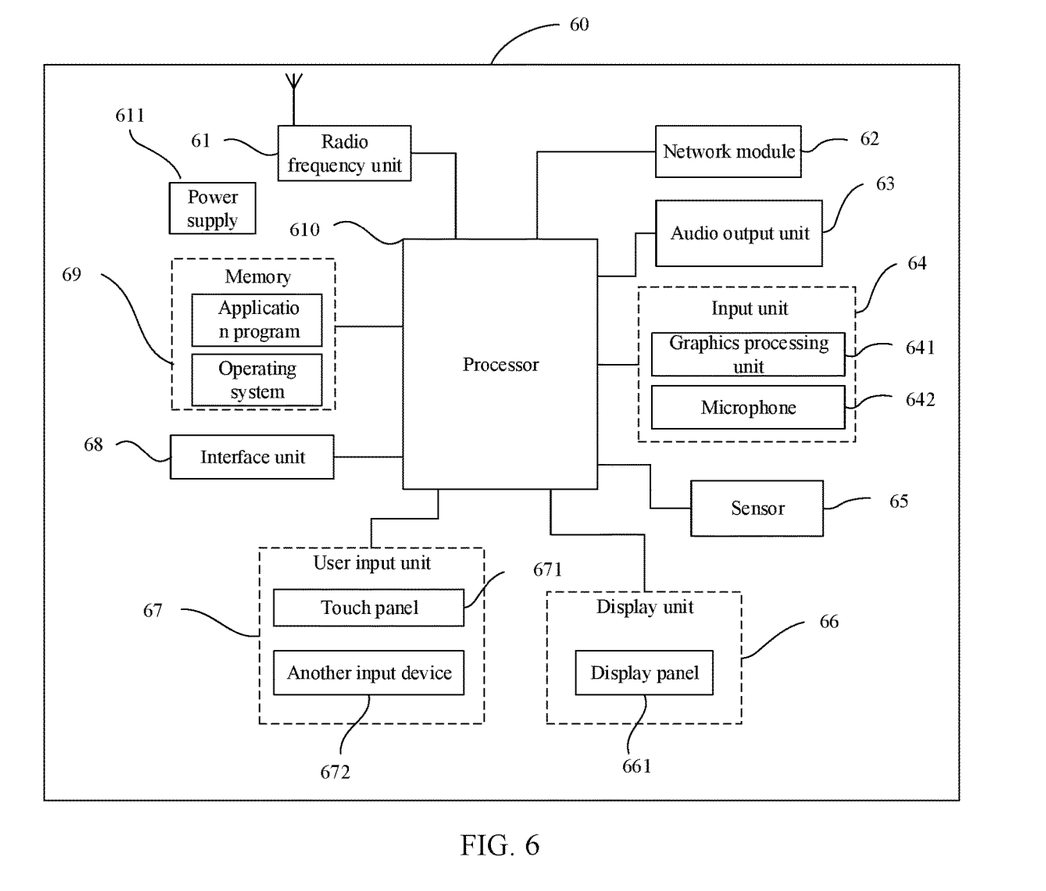
FIG. 6 is a schematic structural diagram of a terminal according to another embodiment of this disclosure.

Referring to FIG. 6, FIG. 6 is a schematic structural diagram of a terminal according to another embodiment of the present disclosure. The terminal 60 includes but is not limited to: a radio frequency unit 61, a network module 62, an audio output unit 63, an input unit 64, a sensor 65, a display unit 66, a user input unit 67, an interface unit 68, a memory 69, a processor 610, a power supply 611, and other components. A person skilled in the art may understand that the structure of the terminal shown in FIG. 6 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet computer, a notebook computer, a palmtop computer, a vehicle-mounted terminal, a wearable device, a pedometer, or the like.

The radio frequency unit 61 is configured to receive configuration information of a first SRS resource set sent by a network side device, where the configuration information includes an identifier of the first SRS resource set, and the identifier of the first SRS resource set is used to indicate an identifier of an antenna panel of the terminal.

In the embodiments of the present disclosure, the identifier of the first SRS resource set is used to indicate the identifier of the antenna panel of the terminal, so that the information of the antenna panel can be exchanged between the network side and the terminal.

It should be understood that, in this embodiment of the present disclosure, the radio frequency unit 61 may be configured to receive and transmit information, or receive and transmit signals during a call. Specifically, the radio frequency unit 61 receives downlink data from a base station, and transmits the downlink data to the processor 610 for processing; and in addition, transmits uplink data to the base station. Generally, the radio frequency unit 61 includes, but is not limited to, an antenna, at least one amplifier, a transceiver, a coupler, a low noise amplifier, a duplexer, and the like. In addition, the radio frequency unit 61 may also communicate with other devices through a radio communication system and network.

The terminal provides a user with wireless broadband Internet access through the network module 62, for example, help the user send and receive emails, browse web pages, and access streaming media.

The audio output unit 63 may convert audio data received by the radio frequency unit 61 or the network module 62 or stored in the memory 69 into an audio signal and output the audio signal as a sound. Moreover, the audio output unit 63 may further provide audio output (for example, call signal receiving sound and message receiving sound) related to a specific function performed by the terminal 60. The audio output unit 63 includes a loudspeaker, a buzzer, a telephone receiver, and the like.

The input unit 64 is configured to receive an audio signal or a video signal. The input unit 64 may include a graphics processing unit (GPU) 641 and a microphone 642. The graphics processing unit 641 processes image data of a static image or a video obtained by an image capturing apparatus (for example, a camera) in a video capturing mode or an image capturing mode. A processed image frame can be displayed on the display unit 66. The image frame processed by the graphics processing unit 641 may be stored in the memory 69 (or another storage medium) or sent through the radio frequency unit 61 or the network module 62. The microphone 642 may receive a sound and can process such sound into audio data. The processed audio data can be converted into a format that can be sent to a mobile communications base station through the radio frequency unit 61 in a telephone call mode, for outputting.

The terminal 60 further includes at least one sensor 65, for example, an optical sensor, a motion sensor, and other sensors. Specifically, the optical sensor includes an ambient optical sensor and a proximity sensor. The ambient optical sensor can adjust a brightness of a display panel 661 based on a brightness of ambient light. The proximity sensor can close the display panel 661 and/or backlight when the terminal 60 moves to an ear. As a type of motion sensor, an accelerometer sensor may detect an acceleration value in each direction (generally, three axes), and detect a value and a direction of gravity when the accelerometer sensor is static, and may be configured to recognize a terminal posture (such as switching between landscape and portrait modes, a related game, or magnetometer posture calibration), and perform a function related to vibration recognition (such as a pedometer or a knock), and the like. The sensor 65 may further include a fingerprint sensor, a pressure sensor, an iris sensor, a molecular sensor, a gyroscope, a barometer, a hygrometer, a thermometer, an infrared sensor, and the like. Details are not described herein again.

The display unit 66 is configured to display information entered by a user or information provided for the user. The display unit 66 may include a display panel 661, and the display panel 661 may be configured in a form of a liquid crystal display (LCD), an organic light-emitting diode (OLED), or the like.

The user input unit 67 may be configured to receive the input digital or character information, and generate key signal input related to user setting and function control of the terminal. Specifically, the user input unit 67 includes a touch panel 671 and another input device 672. The touch panel 671 is also referred to as a touchscreen, and may collect a touch operation performed by a user on or near the touch panel 671 (such as an operation performed by a user on the touch panel 671 or near the touch panel 671 by using any proper object or accessory, such as a finger or a stylus). The touch panel 671 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 610, and receives and executes a command sent by the processor 610. In addition, the touch panel 671 may be implemented in various types such as resistive, capacitive, infrared, and surface acoustic wave. In addition to the touch panel 671, the user input unit 67 may further include the another input device 672. Specifically, the another input device 672 may include, but is not limited to, a physical keyboard, functional keys (for example, a volume control key and a switch key), a trackball, a mouse, and a joystick. Details are not described herein again.

Further, the touch panel 671 may cover the display panel 661. When detecting the touch operation on or near the touch panel 671, the touch panel 671 transmits the touch operation to the processor 610 to determine a type of a touch event, and then the processor 610 provides corresponding visual output on the display panel 661 based on the type of the touch event. Although in FIG. 6, the touch panel 671 and the display panel 661 implement input and output functions of the terminal as two independent components, in some embodiments, the touch panel 671 and the display panel 661 may be integrated to implement the input and output functions of the terminal. This is not specifically limited herein.

The interface unit 68 is an interface connecting an external apparatus to the terminal 60. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and a headset port. The interface unit 68 may be configured to receive an input (for example, data information or power) from an external apparatus and transmit the received input to one or more elements in the terminal 60, or transmit data between the terminal 60 and the external apparatus.

The memory 69 may be configured to store a software program as well as every kind of data. The memory 69 may mainly include a program storage area and a data storage area. The program storage area may store an operating system, an application program required by at least one function (such as a sound playback function and an image playback function), and the like. The data storage area may store data (such as audio data and an address book) created based on the use of the mobile phone, and the like. In addition, the memory 69 may include a high-speed random access memory, and may further include a non-volatile memory such as at least one magnetic disk storage component, a flash memory component, or another volatile solid-state storage component.

The processor 610 is a control center of the terminal, connects various parts of the entire terminal by using various interfaces and circuits, and performs various functions of the terminal and processes data by running or executing software programs and/or modules stored in the memory 69 and invoking data stored in the memory 69, so as to monitor the terminal as a whole. The processor 610 may include one or more processing units. Optionally, the processor 610 may integrate an application processor and a modem processor. The application processor mainly processes an operating system, a user interface, an application program, and the like. The modem processor mainly processes wireless communication. It may be understood that the foregoing modem processor may not be integrated into the processor 610.

The terminal 60 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the terminal 60 includes some function modules not shown, and details are not described herein again.

Figure 7:
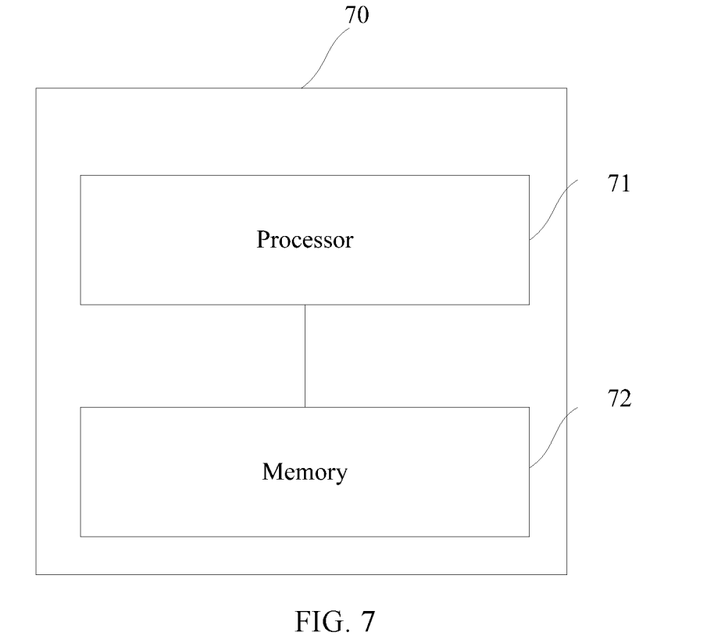
FIG. 7 is a schematic structural diagram of a network side device according to an embodiment of the present disclosure.

FIG. 7 is a schematic structural diagram of a network side device according to another embodiment of the present disclosure. The network side device 70 includes: a processor 71 and a memory 72. In this embodiment of the present disclosure, the network side device 70 further includes a computer program that is stored in the memory 72 and that can run on the processor 71, and when the processor 71 executes the computer program, the following steps are implemented:

sending configuration information of a first SRS resource set to a terminal, where the configuration information includes an identifier of the first SRS resource set, and the identifier of the first SRS resource set is used to indicate an identifier of an antenna panel of the terminal.

The processor 71 is responsible for bus architecture management and general processing. The memory 72 may store data used by the processor 71 when the processor 71 performs an operation.

Optionally, the configuration information further includes:

other configuration parameters of the SRS resource set other than the identifier of the first SRS resource set, where at least one of the other configuration parameters is not configured with a parameter value.

Optionally, that at least one of the other configuration parameters is not configured with a parameter value includes:

a specified configuration parameter of the other configuration parameters is not configured with a parameter value; or all of the other configuration parameters are not configured with parameter values.

Optionally, the configuration information further includes:

a resource type of the first SRS resource set, where the resource type is configured to be aperiodic or semi-persistent.

Optionally, the configuration information further includes:

a resource type of the first SRS resource set, where the resource type is configured to be periodic; and usage indication information, where the usage indication information is used to indicate that the identifier of the first SRS resource set is used to indicate the identifier of the antenna panel of the terminal.

Optionally, the configuration information further includes:

usage indication information, where the usage indication information is used to indicate that the identifier of the first SRS resource set is used to indicate the identifier of the antenna panel of the terminal.

Optionally, the usage indication information is indicated explicitly or implicitly.

Optionally, when the usage indication information is indicated explicitly, the usage indication information is a newly added configuration parameter in the configuration information; or the usage indication information is in usage information in the configuration information.

Optionally, when the usage indication information is indicated implicitly, at least one specified configuration parameter in the configuration information is not configured with a parameter value or configured as a specified value.

Optionally, the number of first SRS resource sets is equal to the number of antenna panels of the terminal.

Optionally, when the computer program is executed by the processor 71, the following steps may be further performed:

sending configuration information of a second SRS resource set to the terminal, where the second SRS resource set is used for beam management; where a sum of the number of first SRS resource sets and the number of second SRS resource sets is equal to the number of antenna panels of the terminal.

Optionally, when the computer program is executed by the processor 71, the following steps may be further performed:

the sending configuration information of a first SRS resource set to a terminal includes:

if the terminal is a terminal with multiple antenna panels, sending the configuration information of the first SRS resource set to the terminal; or if the terminal supports configuration of the second SRS resource set and the configurable number of second SRS resource sets supported is greater than 1, determining that the terminal is a terminal with multiple antenna panels, and sending the configuration information of the first SRS resource set to the terminal; or if the terminal supports configuration of the second SRS resource set and the configurable number of SRS resource sets supported is greater than 1, determining that the terminal is a terminal with multiple antenna panels, and sending the configuration information of the first SRS resource set to the terminal; or if the terminal supports configuration of the second SRS resource set, the configurable number of second SRS resource sets supported is 1, and the terminal is a terminal with multiple antenna panels, sending the configuration information of the first SRS resource set to the terminal; or if the terminal supports configuration of the second SRS resource set, the configurable number of SRS resource sets supported is 1, and the terminal is a terminal with multiple antenna panels, sending the configuration information of the first SRS resource set to the terminal;

where the second SRS resource set is used for beam management.

Optionally, when the computer program is executed by the processor 71, the following steps may be further performed:

if the terminal does not support configuration of the second SRS resource set, determining that the terminal is a terminal with a single antenna panel, and skipping sending the configuration information of the first SRS resource set to the terminal; or if the terminal is a terminal with a single antenna panel, skipping sending the configuration information of the first SRS resource set to the terminal; or if the terminal supports configuration of the second SRS resource set and the configurable number of second SRS resource sets supported is 1, determining that the terminal is a terminal with a single antenna panel, and skipping sending the configuration information of the first SRS resource set to the terminal; or if the terminal supports configuration of the second SRS resource set and the configurable number of SRS resource sets supported is 1, determining that the terminal is a terminal with a single antenna panel, and skipping sending the configuration information of the first SRS resource set to the terminal;

where the second SRS resource set is used for beam management.

Optionally, when the computer program is executed by the processor 71, the following steps may be further performed:

receiving terminal capability information reported by the terminal, where the terminal capability information includes at least one of the following:

the configurable number of second SRS resource sets supported by the terminal;

the configurable number of SRS resource sets supported by the terminal;

whether the terminal supports configuration of the second SRS resource set; and the number of antenna panels of the terminal.

Optionally, when the computer program is executed by the processor 71, the following steps may be further performed:

the sending configuration information of a first SRS resource set to a terminal includes:

sending the configuration information of the first SRS resource sets belonging to different component carriers or different BWPs to the terminal.

Optionally, in the configuration information of the first SRS resource sets belonging to different component carriers or different BWPs, an identifier of the same antenna panel of the terminal is indicated by using the same identifier of the first SRS resource set.

Figure 8:
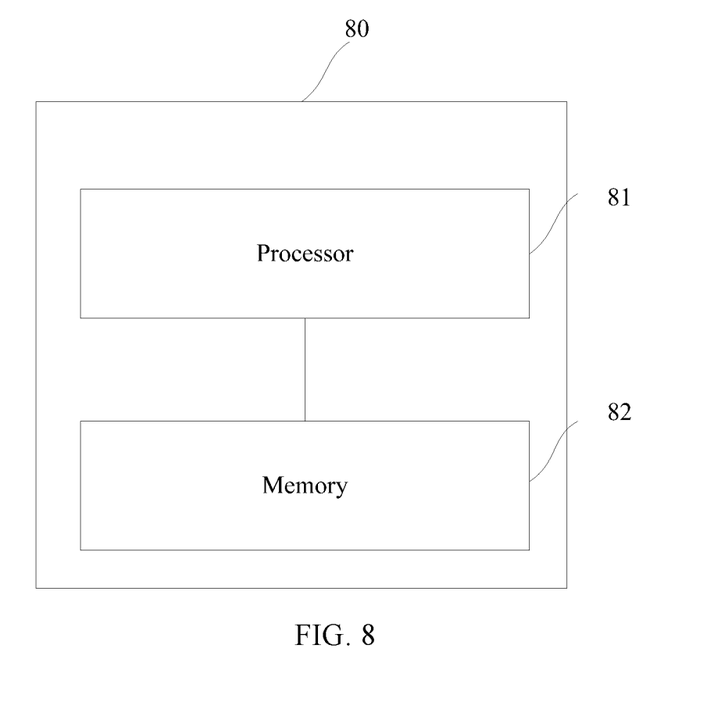
FIG. 8 is a schematic structural diagram of a terminal according to still another embodiment of this disclosure.

Referring to FIG. 8, FIG. 8 is a schematic structural diagram of a terminal according to still another embodiment of this disclosure. The terminal 80 includes: a processor 81 and a memory 82. In the embodiments of the present disclosure, the terminal 80 further includes: a computer program stored in the memory 82 and executable on the processor 81. When the computer program is executed by the processor 81, the following step is performed:

receiving configuration information of a first SRS resource set sent by a network side device, where the configuration information includes an identifier of the first SRS resource set, and the identifier of the first SRS resource set is used to indicate an identifier of an antenna panel of the terminal.

The processor 81 is responsible for bus architecture management and general processing. The memory 82 may store data used by the processor 81 when the processor 81 performs an operation.

Optionally, the configuration information further includes:

other configuration parameters of the SRS resource set other than the identifier of the first SRS resource set, where at least one of the other configuration parameters is not configured with a parameter value.

Optionally, that at least one of the other configuration parameters is not configured with a parameter value includes:

a specified configuration parameter of the other configuration parameters is not configured with a parameter value; or all of the other configuration parameters are not configured with parameter values.

Optionally, the configuration information further includes: a resource type of the first SRS resource set, and the resource type is configured to be aperiodic or semi-persistent.

Optionally, the configuration information further includes:

a resource type of the first SRS resource set, where the resource type is configured to be periodic; and usage indication information, where the usage indication information is used to indicate that the identifier of the first SRS resource set is used to indicate the identifier of the antenna panel of the terminal.

Optionally, the configuration information further includes:

usage indication information, where the usage indication information is used to indicate that the identifier of the first SRS resource set is used to indicate the identifier of the antenna panel of the terminal.

Optionally, the usage indication information is indicated explicitly or implicitly.

Optionally, when the usage indication information is indicated explicitly,
the usage indication information is a newly added configuration parameter in the configuration information; or
the usage indication information is in usage information in the configuration information.

Optionally, when the usage indication information is indicated implicitly, at least one specified configuration parameter in the configuration information is not configured with a parameter value or configured as a specified value.

Optionally, the number of first SRS resource sets is equal to the number of antenna panels of the terminal.

Optionally, when the computer program is executed by the processor 81, the following steps may be further performed:
receiving configuration information of a second SRS resource set sent by the network side device, where the second SRS resource set is used for beam management; and
a sum of the number of first SRS resource sets and the number of second SRS resource sets is equal to the number of antenna panels of the terminal.

Optionally, when the computer program is executed by the processor 81, the following steps may be further performed:
reporting terminal capability information to the network side device, where the terminal capability information includes at least one of the following:
whether the terminal supports configuration of the second SRS resource set;
the number of antenna panels of the terminal;
the configurable number of second SRS resource sets supported by the terminal; and
the configurable number of SRS resource sets supported by the terminal.

Optionally, the receiving configuration information of a first SRS resource set sent by a network side device includes:
receiving the configuration information that is of the first SRS resource sets belonging to different component carriers or different BWPs and that is sent by the network side device.

Optionally, in the configuration information of the first SRS resource sets belonging to different component carriers or different BWPs, an identifier of the same antenna panel of the terminal is indicated by using the same identifier of the first SRS resource set.

Optionally, when the computer program is executed by the processor 81, the following steps may be further performed:
after the receiving configuration information of a first SRS resource set sent by a network side device, the method further includes:
if different identifiers of the first SRS resource set are used to indicate an identifier of a first antenna panel of the terminal in the configuration information of the first SRS resource sets belonging to different component carriers or different BWPs, the identifier of the first antenna panel is indicated by using an identifier of the first SRS resource set of a specified component carrier or a specified BWP.

An embodiment of the present disclosure further provides a computer readable storage medium. The computer readable storage medium stores a computer program. When the computer program is executed by a processor, the processes of the foregoing embodiments of the method for indicating antenna panel information are implemented, and a same technical effect can be achieved. To avoid repetition, details are not described herein again. The computer readable storage medium may be a read-only memory (ROM), a random access memory (RAM), a magnetic disk, a compact disc, or the like.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. An element limited by "includes a . . . " does not, without more constraints, preclude the presence of additional identical elements in the process, method, article, or apparatus that includes the element.

Based on the foregoing descriptions of the implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A method for indicating antenna panel information of a terminal, comprising:
receiving, by the terminal, first configuration information of a first sounding reference signal (SRS) resource set sent by a network side device, wherein the first configuration information of the first SRS resource set comprises an identifier of the first SRS resource set, and the identifier of the first SRS resource set is used to indicate an identifier of an antenna panel of the terminal,
wherein the first configuration information of the first SRS resource set further comprises usage indication information, and the usage indication information indicates that the first configuration information of the first SRS resource set is only used to indicate the identifier of the antenna panel of the terminal and the first configuration information of the first SRS resource set does not configure an SRS resource for SRS transmission;

determining, by the terminal, the identifier of the antenna panel of the terminal according to the identifier of the first SRS resource set, and not transmitting an SRS in association with the first configuration of the first SRS resource set; and receiving, by the terminal, second configuration information of a second SRS resource set sent by the network side device, wherein the second SRS resource set is used for beam management;

wherein a sum of a number of first SRS resource sets and a number of second SRS resource sets is equal to a number of antenna panels of the terminal, the first SRS resource sets including the first SRS resource set, the second SRS resource sets including the second SRS resource set, and the antenna panels including the antenna panel, and the identifier of the antenna panel of the terminal is indicated by using the identifier of the first SRS resource set belonging to a first component carrier or a first bandwidth part (BWP) and a second identifier of another first SRS resource set belonging to a second component carrier or a second bandwidth part (BWP), wherein the second identifier of the another first SRS resource set is the same as the identifier of the first SRS resource set, the first SRS resource sets further including the another first SRS resource set.

2. The method according to claim 1, wherein the first configuration information further comprises:

other configuration parameters of the first SRS resource set other than the identifier of the first SRS resource set, wherein at least one of the other configuration parameters is not configured with a parameter value.

3. The method according to claim 2, wherein that at least one of the other configuration parameters is not configured with the parameter value comprises:

a specified configuration parameter of the other configuration parameters is not configured with the parameter value; or all of the other configuration parameters are not configured with parameter values.

4. The method according to claim 1, wherein the usage indication information is indicated explicitly or implicitly.

5. The method according to claim 4, wherein when the usage indication information is indicated explicitly, the usage indication information is a newly added configuration parameter in the configuration information; or the usage indication information is in usage information in the first configuration information.

6. The method according to claim 4, wherein when the usage indication information is indicated implicitly, at least one specified configuration parameter in the first configuration information is not configured with a parameter value or configured as a specified value.

7. The method according to claim 1, wherein the receiving, by the terminal, the first configuration information of the first SRS resource set sent by the network side device comprises:

receiving the first configuration information that is of the first SRS resource sets belonging to different component carriers including the first component carrier and the second component carrier; or different bandwidth parts (BWPs) including the first BWP and the second BWP.

8. A network side device, comprising:
a processor;
a memory; and
a computer program stored in the memory and executable on the processor, wherein the computer program, when executed by the processor, implements steps of a method for indicating antenna panel information of a terminal, wherein the method comprises:

sending first configuration information of a first sounding reference signal (SRS) resource set to a terminal, wherein the first configuration information of the first SRS resource set comprises an identifier of the first SRS resource set, and the identifier of the first SRS resource set is used to indicate an identifier of an antenna panel of the terminal, wherein the first configuration information of the first SRS resource set further comprises usage indication information, and the usage indication information indicates that the first configuration information of the first SRS resource set is only used to indicate the identifier of the antenna panel of the terminal and the first configuration information of the first SRS resource set does not configure an SRS resource for SRS transmission;

sending second configuration information of a second SRS resource set to the terminal, wherein the second SRS resource set is used for beam management;

wherein a sum of a number of first SRS resource sets and a number of second SRS resource sets is equal to a number of antenna panels of the terminal, the first SRS resource sets including the first SRS resource set, the second SRS resource sets including the second SRS resource set, and the antenna panels including the antenna panel, and the identifier of the antenna panel of the terminal is indicated by using the identifier of the first SRS resource set belonging to a first component carrier or a first bandwidth part (BWP) and a second identifier of another first SRS resource set belonging to a second component carrier or a second bandwidth part (BWP), wherein the second identifier of the another first SRS resource set is the same as the identifier of the first SRS resource set, the first SRS resource sets further including the another first SRS resource set.

9. The network side device according to claim 8, wherein the sending of the first configuration information of the first SRS resource set to the terminal comprises:

if the terminal is a terminal with multiple antenna panels, sending the first configuration information of the first SRS resource set to the terminal; or if the terminal supports a configuration of the second SRS resource set and a configurable number of the second SRS resource sets supported is greater than 1, determining that the terminal is a terminal with multiple antenna panels, and sending the first configuration information of the first SRS resource set to the terminal; or if the terminal supports a configuration of the second SRS resource set, a configurable number of the second SRS resource sets supported is 1, and the terminal is a terminal with multiple antenna panels, sending the first configuration information of the first SRS resource set to the terminal.

10. A terminal, comprising:
a processor;
a memory; and a computer program stored in the memory and executable on the processor, wherein the computer program, when executed by the processor, implements steps of a method for indicating antenna panel information of a terminal, wherein the method comprises:

receiving first configuration information of a first sounding reference signal (SRS) resource set sent by a network side device, wherein the first configuration information of the first SRS resource set comprises an identifier of the first SRS resource set, and the identifier of the first SRS resource set is used to indicate an identifier of an antenna panel of the terminal;

wherein the first configuration information of the first SRS resource set further comprises usage indication information, and the usage indication information indicates that the first configuration information of the first SRS resource set is only used to indicate the identifier of the antenna panel of the terminal and the first configuration information of the first SRS resource set does not configure an SRS resource for SRS transmission;

determining the identifier of the antenna panel of the terminal according to the identifier of the first SRS resource set, and not transmitting an SRS in association with the first configuration of the first SRS resource set; and receiving second configuration information of a second SRS resource set sent by the network side device, wherein the second SRS resource set is used for beam management;

wherein a sum of a number of first SRS resource sets and a number of second SRS resource sets is equal to a number of antenna panels of the terminal, the first SRS resource sets including the first SRS resource set, the second SRS resource sets including the second SRS resource set, and the antenna panels including the antenna panel, and the identifier of the antenna panel of the terminal is indicated by using the identifier of the first SRS resource set belonging to a first component carrier or a first bandwidth part (BWP) and a second identifier of another first SRS resource set belonging to a second component carrier or a second bandwidth part (BWP), wherein the second identifier of the another first SRS resource set is the same as the identifier of the first SRS resource set, the first SRS resource sets further including the another first SRS resource set.

11. The terminal according to claim 10, wherein the first configuration information further comprises:

other configuration parameters of the first SRS resource set other than the identifier of the first SRS resource set, wherein at least one of the other configuration parameters is not configured with a parameter value.

12. The terminal according to claim 10, wherein the receiving the first configuration information of the first SRS resource set sent by the network side device comprises:

receiving the first configuration information that is of the first SRS resource sets belonging to different component carriers including the first component carrier and the second component carrier; or the different bandwidth parts (BWPs) including the first BWP and the second BWP.

* * * * *